No. 861,625. PATENTED JULY 30, 1907.
J. W. WOOLEY.
WALKING TRACTION WHEEL.
APPLICATION FILED FEB. 4, 1907.

2 SHEETS—SHEET 1.

Witnesses
G. R. Thomas
Wm. E. Olinn

Inventor
J. W. Wooley

By Swift & Co.

Attorneys

No. 861,625. PATENTED JULY 30, 1907.
J. W. WOOLEY.
WALKING TRACTION WHEEL.
APPLICATION FILED FEB. 4, 1907.
2 SHEETS—SHEET 2.
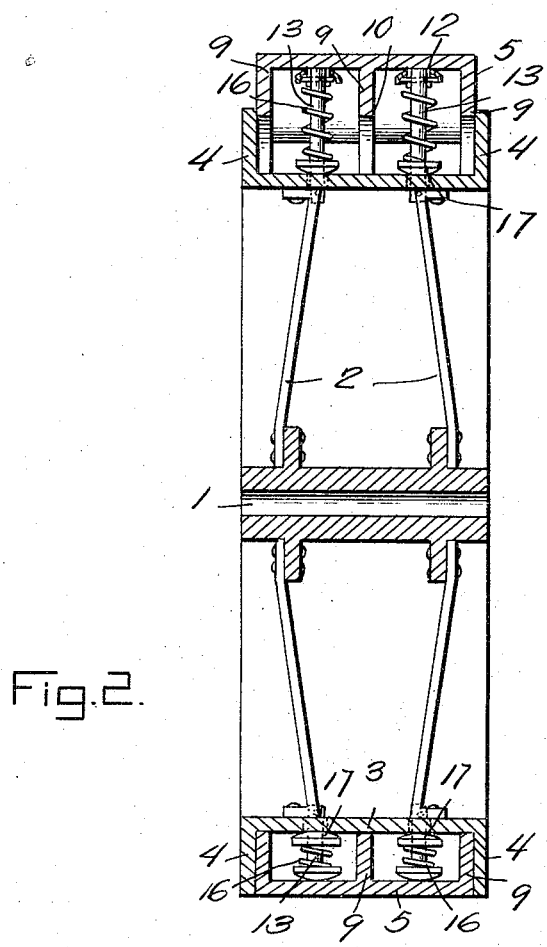
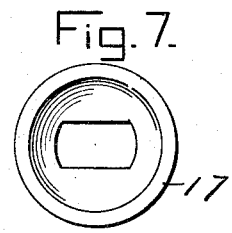
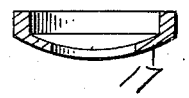
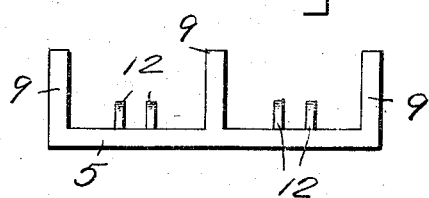
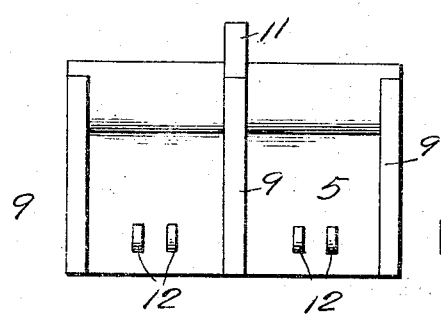

UNITED STATES PATENT OFFICE.

JOHN W. WOOLEY, OF BERKLEY, VIRGINIA.

WALKING TRACTION-WHEEL.

No. 861,625.          Specification of Letters Patent.          Patented July 30, 1907.

Application filed February 4, 1907. Serial No. 355,657.

*To all whom it may concern:*

Be it known that I, JOHN W. WOOLEY, a citizen of the United States, residing at Berkley, in the county of Norfolk and State of Virginia, have invented a new and useful Walking Traction-Wheel; and I do hereby declare the following to be a full, clear, and exact description of the invention, such as will enable others skilled in the art to which it appertains to make and use the same.

This invention relates to traction wheels, and it has for an object to provide a wheel which carries a series of blades having substantially the movement of the human foot to prevent the same from sinking into the ground and so that little or no jarring action takes place.

Other and further objects will appear in the following description and will be more particularly pointed out in the claims.

Figure 1:
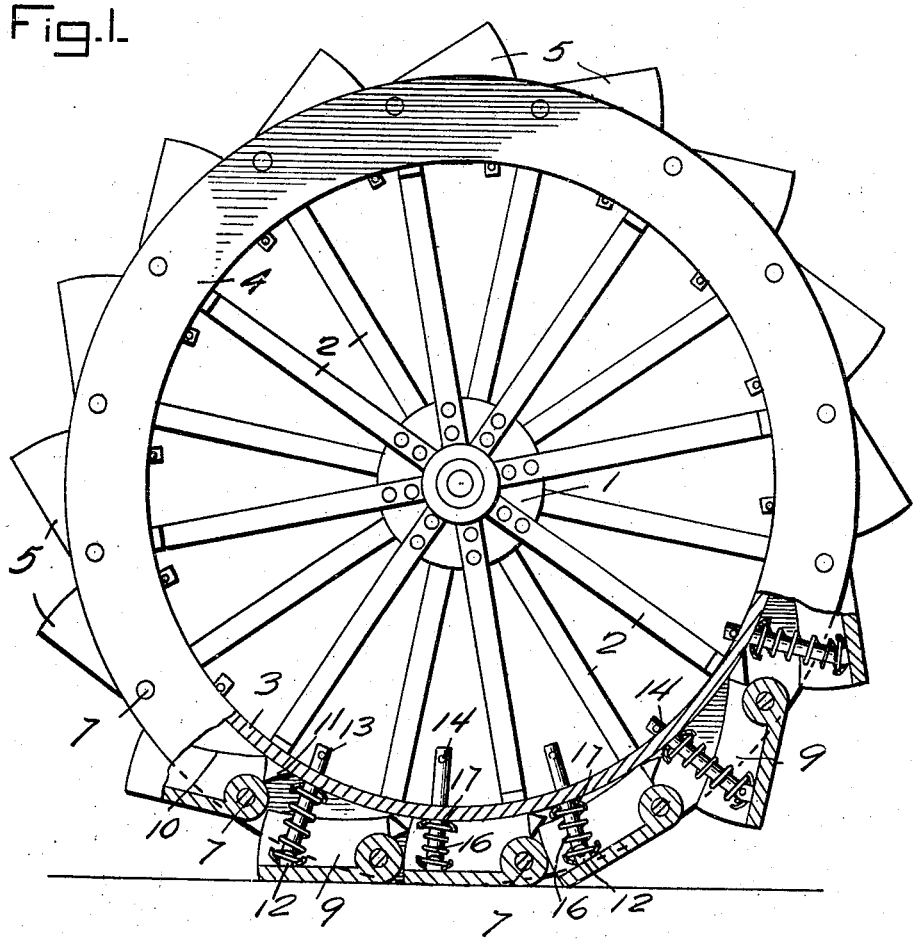
Figure 3:
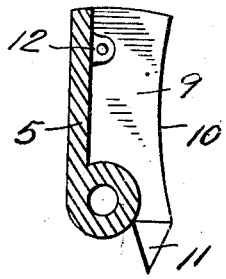
Figure 4:
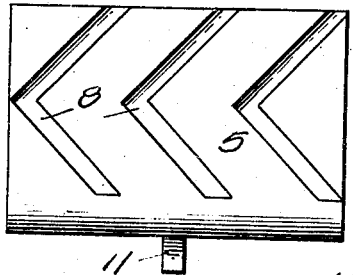

In the drawings, Figure 1 is a side elevation partly in section. Fig. 2 is a vertical transverse section. Fig. 3 is a detail section of one of the blades. Fig. 4 is a view of the outer side of a blade. Fig. 5 is a front end view of a blade. Fig. 6 is a view of the inner side of a blade. Fig. 7 is a detail view of one of the spring supports, and Fig. 8 is a sectional view of one of the spring supports.

Referring more particularly to the drawings, 1 indicates the hub and 2 the spokes which connect to the hub with a rim 3 having a pair of annular flanges 4.

Arranged about the wheel between the flanges is a series of blades 5, each of which has a width approximately equal to the distance between the flanges. Each blade is journaled at its rear end on a pin 7, which connects the flanges 4. The outer face of each blade is roughened at 8, in a manner usual in traction wheels. The inner face of each blade carries a series of strengthening ribs 9 which are curved at 10 on their free edge, to fit the rim 3. To limit the outward swinging of the blades, each blade carries a rearward extension or stop 11, which, when the blade is swung out, a certain distance, comes in contact with the rim and limits the movement of the said blade.

Arranged on the inner face of each blade near the front end of the latter, are two pairs of ears 12, between each pair of which, is pivoted a guide rod 13 which passes through a perforation in the rim and is provided with lugs 14 beyond the rim so as to limit the outward swinging of the blade.

Surrounding each guide rod 13, is a cushion in the form of a helical spring 16 which is seated at each end in a pocket in a rocking support 17, one bearing against the rim, and the other bearing against the blade whereby the spring is adapted to assume various positions.

The blades are held outwardly from the rim by springs 16 in such a position that the blades move toward the surface over which the wheel travels in lines approximately parallel to the surface. In other words, when the pivoted end of a blade reaches the surface, the free end will also be in contact with the surface, and as the wheel moves further on, the free end will be compressed.

Having thus described my invention, what I claim is:

1. A traction-wheel having a series of blades arranged about its rim, each blade being pivoted at one end and having a cushion arranged between the other end and the rim, and a stop projecting from the pivoted end to engage the rim and limit the outward swinging of the blade.

2. A traction wheel having a series of blades arranged about its rim, each blade being pivoted at one end, and having a cushion arranged between the other end and the rim and a series of ribs upon its inner face curved to fit the rim.

3. A traction wheel having a series of blades arranged about its rim each blade being pivoted at one end and having a cushion arranged between the other end and the rim and rocking supports for the ends of the cushion.

4. A traction wheel having a series of blades arranged about its rim, each blade being pivoted at one end, and having a guide rod pivoted to the other end and working through the rim, and a helical spring surrounding the guide rod.

5. A traction wheel having a series of blades arranged about its rim, each blade being pivoted at one end, and having a guide rod pivoted to the other end, and working through the rim, and a helical spring surrounding the guide rod and rocking supports having pockets in which the ends of the spring are seated.

6. A traction wheel, having a series of blades arranged about its rim each blade being pivoted at one end, and having a guide rod pivoted to the other end and working through the rim, and a helical spring surrounding the guide rod, the end of the guide rod being provided with lugs to limit the outward swinging of the blade.

7. A blade for traction wheels formed with a pivot opening at one end, stops projecting from the end carrying the pivot opening, and ribs on the inner face having their free edges curved.

8. A traction wheel provided with a rim having flanges at opposite sides, a series of blades each pivoted at one end between the flanges, and cushions arranged between the free ends of the blades and the rim, and means for limiting the outward swinging of the blades, rocking supports for the ends of the cushions, and a series of ribs upon the inner faces of the blades, curved to fit the rim.

In testimony whereof I have signed my name to this specification in the presence of two subscribing witnesses.

JOHN W. WOOLEY.

Witnesses:
R. W. PORTER,
CHAS. J. SWEETMAN, Jr.